(12) United States Patent
Anderson et al.

(10) Patent No.: US 8,618,766 B2
(45) Date of Patent: Dec. 31, 2013

(54) ROBOT POWER SOURCE CHARGING STATION

(75) Inventors: Noel Wayne Anderson, Fargo, ND (US); Alex D. Foessel, Sherrard, IL (US); Andrew Joseph Valentine, Raleigh, NC (US)

(73) Assignee: Deere & Company, Moline, IL (US)

( * ) Notice: Subject to any disclaimer, the term of this patent is extended or adjusted under 35 U.S.C. 154(b) by 479 days.

(21) Appl. No.: 12/891,355

(22) Filed: Sep. 27, 2010

(65) Prior Publication Data

US 2012/0074891 A1 Mar. 29, 2012

(51) Int. Cl.
*H02J 7/00* (2006.01)
*H01M 10/44* (2006.01)
*H01M 10/46* (2006.01)

(52) U.S. Cl.
USPC .......................................... 320/101; 320/108

(58) Field of Classification Search
USPC ......................................................... 320/101
See application file for complete search history.

(56) References Cited

U.S. PATENT DOCUMENTS

| 5,710,502 | A * | 1/1998 | Poumey ........................ 320/108 |
| 5,731,544 | A | 3/1998 | Burck et al. |
| 7,610,122 | B2 | 10/2009 | Anderson |
| 7,668,631 | B2 | 2/2010 | Bernini |
| 2007/0235616 | A1 * | 10/2007 | Gross et al. ................ 248/346.5 |
| 2009/0096413 | A1 | 4/2009 | Partovi et al. |
| 2009/0127937 | A1 | 5/2009 | Widmer et al. |
| 2009/0298539 | A1 | 12/2009 | Anderson |
| 2009/0299582 | A1 | 12/2009 | Anderson |
| 2010/0013434 | A1 * | 1/2010 | Taylor-Haw et al. ......... 320/109 |
| 2010/0072946 | A1 * | 3/2010 | Sugano ........................ 320/108 |
| 2010/0127660 | A1 * | 5/2010 | Cook et al. .................... 320/108 |
| 2010/0277121 | A1 | 11/2010 | Hall et al. |
| 2011/0115430 | A1 * | 5/2011 | Saunamaki ................... 320/108 |

FOREIGN PATENT DOCUMENTS

EP 1302147 B1 4/2003

OTHER PUBLICATIONS

EP search report dated Aug. 30, 2013 regarding application 11182084.1-1806/2434610, reference 19061 EP Loe/VG, applicant Deere & Company, 6 pages.

* cited by examiner

*Primary Examiner* — Arun Williams
(74) *Attorney, Agent, or Firm* — Yee & Associates, P.C.

(57) ABSTRACT

Embodiments of the invention are directed to a system for recharging a mobile robot as a power source. In one embodiment the system comprises a power transmission link having a first end positioned at a selectively located charging station and a second end connected to the battery carried by the robot, the transmission link being configured to transmit power from its first end to its second end to charge the battery. The system further comprises a first wireless power transmitter coupled to receive power from a specified power source, and a first wireless power receiver, connected to the first end of the transmission link and located at a prespecified distance from the first wireless power transmitter. The first wireless power receiver is configured to receive power transmitted across the prespecified distance from the first wireless power transmitter, and to provide power to the first end of the transmission link, for transmission to charge the battery.

4 Claims, 3 Drawing Sheets

ROBOT POWER SOURCE CHARGING STATION

FIELD OF THE INVENTION

The invention disclosed and claimed herein pertains to a system and method for charging a battery used as a power source for a mobile robot or the like. More particularly, the invention pertains to a system and method of the above type that uses wireless power transmission, thus delivers more mobile robot durability, and is minimally destructive to the surrounding environment.

BACKGROUND OF THE INVENTION

Power charging stations for mobile outdoor service robots, such as robotic lawnmowers, are well known in the art. If a robot vehicle uses an electric battery as a source of power, the robot can be directed to the station whenever it is necessary to charge or recharge the battery. However, charging arrangements of this type, when used outdoors, can have significant drawbacks or deficiencies.

As an example, in currently available systems, both the robot vehicle and the charging station have corresponding or complementary conductors or conductive elements. The conductive elements must be mated together, in order to transfer electric power from the station to the robot vehicle. However, these conductive elements are typically exposed to weather conditions and moisture, and over time may become oxidized and mechanically fatigued. Mud and debris can also collect on the conductive elements. As a result, the capability to transfer power to the robot, using these conductive elements, becomes degraded or diminished, and the overall system durability, compromised.

Another problem with presently used outdoor charging systems is that an exterior or outdoor electric outlet will generally be required as a power source, but may not be conveniently available. For example, it may be desired to use a robotic lawnmower of the above type to mow a lawn which is adjacent to a house or other building that has no exterior outlet. Alternatively, the only exterior outlets could be on a side of the building that is opposite to the lawn that is to be mowed. In either case, it would be necessary to install an exterior outlet, which could be expensive and also destructive to the building.

In addition, outdoor charging systems of the above type generally have only a single charging station. This can result in excessive wear of grass or other yard elements that are adjacent to the station, since the robotic mower must frequently go to and maneuver around this location. It might be possible to alleviate this problem by providing multiple charging stations at different locations. However, it would then be necessary to provide an exterior outlet at each of the multiple locations, which could further aggravate the problem discussed above in regard to the availability of such outlets, as well as increasing overall system cost.

SUMMARY

Embodiments of the invention are directed to a system for recharging a battery that is carried by a mobile robot or robot vehicle as a power source. The system comprises a power transmission link having a first end positioned at a selectively located charging station, and a second end connected to the battery carried by the robot, the transmission link being configured to transmit power from its first end to its second end to charge the battery. The system further comprises a first wireless power transmitter coupled to receive power from a specified power source, and a first wireless power receiver connected to the first end of the transmission link and located at a prespecified distance from the first wireless power transmitter. The first wireless power receiver is configured to receive power transmitted across the prespecified distance from the first wireless power transmitter, and to provide power to the first end of the transmission link, for transmission to charge the battery.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
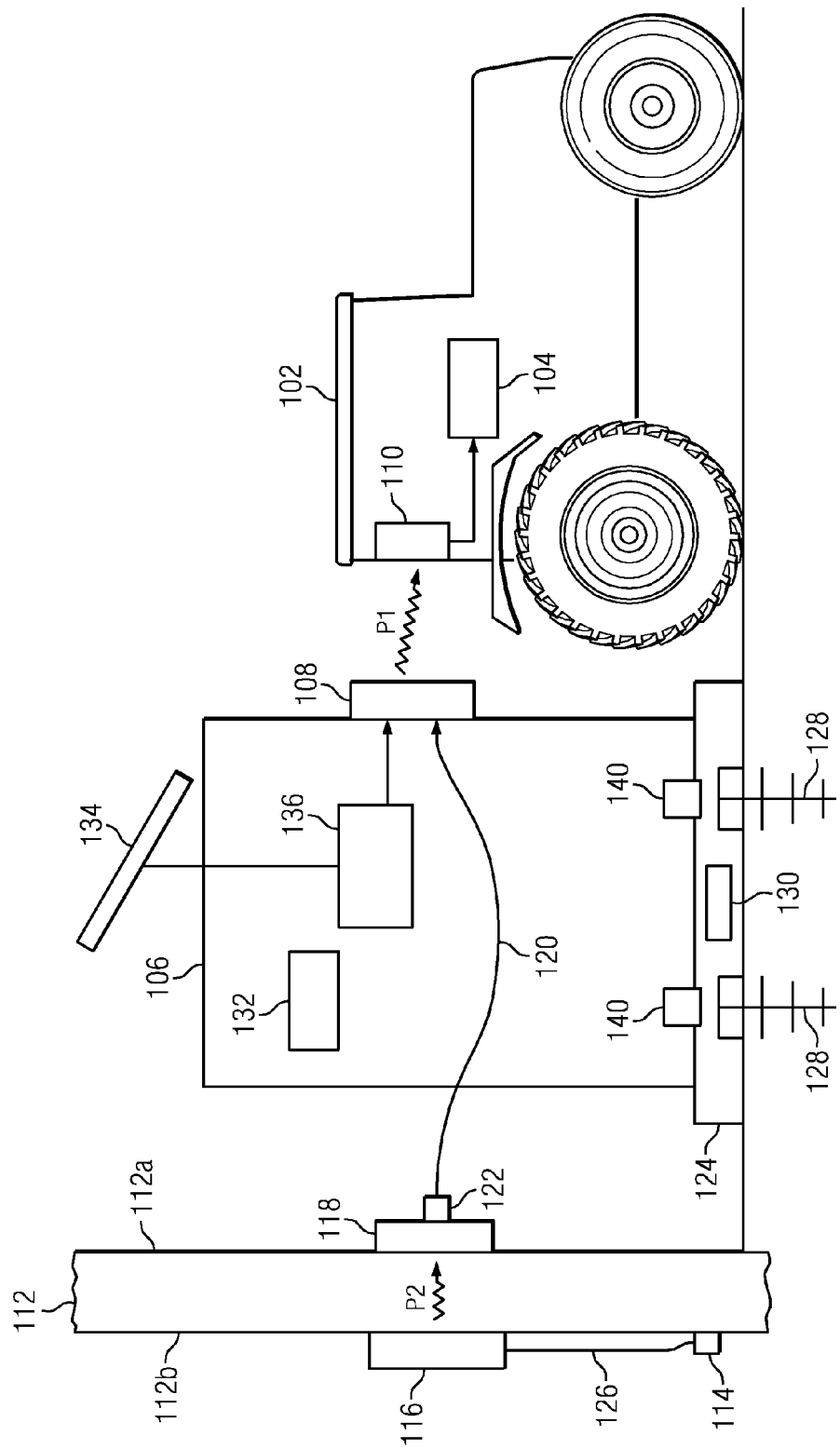
FIG. 1 is a schematic diagram showing an embodiment of the invention.

Referring to FIG. 1, there is shown a service robot 102 for performing outdoor tasks of some type, as directed by a conventional control mechanism (not shown) that may be remotely located or carried aboard the robot. Robot 102 may by way of example comprise a robotic lawnmower, but the invention is not limited thereto. FIG. 1 shows robot 102 provided with a rechargeable electric battery 104, which provides power for moving and maneuvering robot 102, and also for performing other functions needed in the operation of robot 102.

FIG. 1 further shows a charging station 106, which is provided to charge or recharge battery 104 of the service robot 102, as required. Station 106 is removably placed upon a plate or base plate 124, described hereinafter in further detail. In accordance with an embodiment of the invention, station 106 is furnished with a wireless power transmitter 108, which is coupled to a source of power as likewise described hereinafter in further detail. Robot 102 is provided with a complementary wireless power receiver 110, which is connected to battery 104. Transmitter 108 and receiver 110 may, for example, be respective components of a system known in the art that transmits power by inductive coupling, rather than through a wire or other conductor. Systems of this type are referred to such as in SAE J1773, a standard for induction powered coupling. As used herein, "power transfer" and "energy transfer" are viewed as interchangeable, recognizing that power is energy per unit time.

At present, systems are available that can transfer power on the order of hundreds of watts from a wireless power transmitter to a wireless power receiver, when the transmitter and receiver are separated by a spacing on the order of twelve inches to three feet or more. Thus, in order to charge battery 104, robot 102 would be maneuvered by its control to position receiver 110 at a distance or spacing from transmitter 108 that is within a pre-specified range. The wireless transmitter 108 is then operated to transmit power P1 to wireless receiver 110, and receiver 110 couples the received power to recharge battery 104.

The power transfer efficiency between transmitter and receiver drops as the distance between them grows. At some distance, it is impractical to transfer power between the transmitter and receiver. This defines the effective range of power transfer.

It will appreciated that by using transmitter 108 and receiver 110 to transfer power, it is not necessary to mate or join complementary conductive elements together to effect power transfer, unlike certain prior art arrangements. Also, power can be transferred while transmitter 108 and receiver 110 are both kept tightly sealed, and thus protected against moisture, mud and the like.

Referring further to FIG. 1, there is shown a wall 112 that is proximate or adjacent to charging station 106, wherein the wall has an exterior side 112a and an interior side 112b. Wall 112 may be an exterior or outside wall of a conventional house, garage or other detached building. FIG. 1 shows that station 106 is located outdoors, adjacent to the exterior side 112a of wall 112. FIG. 1 also shows a conventional 110 volt electrical outlet 114, adjoining the interior side 112b of the wall.

In accordance with embodiments of the invention, it is intended to use the conventional interior outlet 114 as the power source for wireless transmitter 108, and thus as the source for charging battery 104. To accomplish this, FIG. 1 shows a wireless power transmitter 116 mounted to the interior side 112b of wall 112, proximate to outlet 114. Transmitter 116 may be similar or identical to wireless transmitter 108, and is provided with an electric cord 126 that can be plugged into a socket of outlet 114. FIG. 1 also shows a wireless power receiver 118, which may be similar or identical to wireless receiver 110, and which is mounted to the exterior side 112a of wall 112, in opposing relationship with transmitter 116.

By providing the components 116 and 118 arranged as shown by FIG. 1, power can be readily obtained by wireless transmitter 116 from interior outlet 114. Transmitter 116 can then transfer the power through wall 112, as power P2, to wireless receiver 118. FIG. 1 further shows receiver 118 connected to wireless transmitter 108 at station 106 by means of a power cord, or other conductor 120. Thus, power can travel from receiver 118 to wireless power transmitter 108 through conductor 120, in order to supply power needed by transmitter 108 and receiver 110 to charge battery 104. Moreover, while the power is initially obtained from an outlet located inside the building of which wall 112 is part, it is unnecessary to make a hole through or otherwise modify wall 112, in order to deliver power through wall 112 to charging station 106 and robot 102.

In different embodiments, the space between transmitter and receiver may be a material or structure other than a wall. The opposing sides of the space may be arbitrarily designated interior and exterior. In another embodiment, receiver 118 could be located with the housing of station 106.

In embodiments of the invention, it may be useful to enable charging station 106 to be readily removable from base plate 124, such as for secure storage when it is not in use. Alternatively, station 106 may need to be periodically relocated, in order to minimize yard wear at any one location. Accordingly, conductor 120 may be detachably connected to receiver 118 such as by means of a plug and socket arrangement 122. Also, it may be desirable to securely attach station 106 to base plate 124, whenever the station is placed thereon. FIG. 1 thus shows locking mechanisms 140 provided to selectively lock station 106 to plate 124. Mechanisms 140 may be operated or released by means of a key or the like.

To ensure that base plate 124 is firmly connected to a location on the ground, anchors 128 are provided. Usefully, each anchor 128 is of a type that may be screwed into the ground by hand, to attach the plate 124, and may be unscrewed to release the plate. In general, anchor 128 may be any means which makes it difficult for unauthorized movement of charging station 106. For example, it may be desired to relocate the base plate 124. Also, to enhance security a tampering sensor 130 is placed in base plate 124, wherein the sensor 130 is a capacitive sensor that can detect a change in electrical permittivity under the station that is not explainable by soil moisture changes. For example, if a shovel was used by an unauthorized person to dig around the anchors 128, sensor 130 would detect the presence of a metallic shovel, the absence of dirt or the presence of air. If tampering is detected, an alarm or alerting device 132 would be activated. Device 132 could comprise, for example, a visual, audio, email or cell phone related device.

FIG. 1 further shows charging station 106 equipped with an alternate power source comprising a solar cell 134 and a battery 136 or a battery and ultra capacitor. By providing the alternate power source, station 106 can be used far from a building, or in the complete absence of power line supplied electrical service. Other alternate power sources could include, but are not limited to, a fuel cell, a wind generator and a piezo electric generator.

Figure 2:
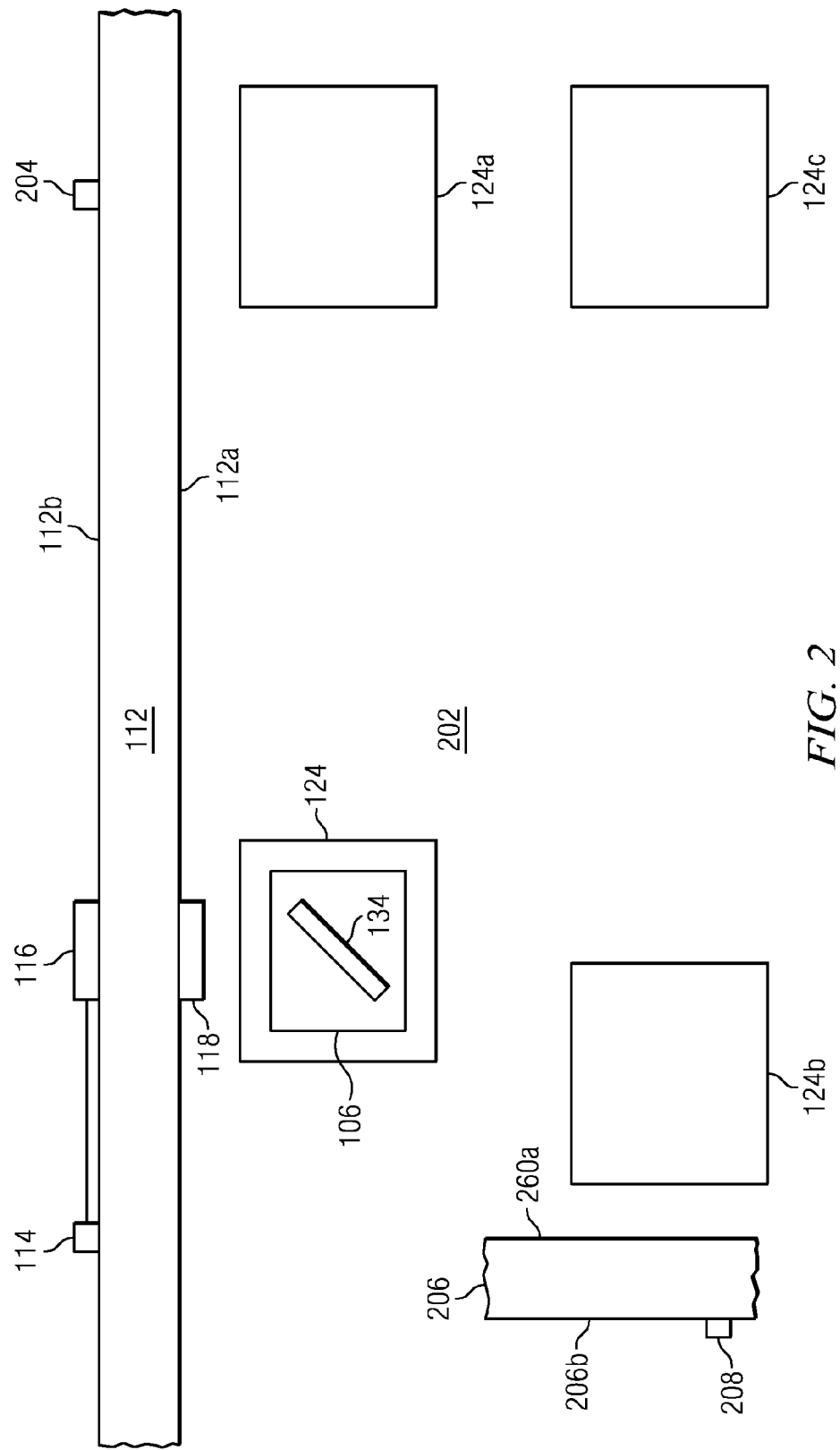
FIG. 2 is a schematic overhead view showing a further embodiment of the invention.

Referring to FIG. 2, there is shown an overhead view of charging station 106 and wall 112, to further illustrate embodiments of the invention. FIG. 2 shows exterior side 112a of wall 112 adjacent to a yard, lawn or other area 202 in which work is to be performed by service robot 102 (not shown in FIG. 2).

FIG. 2 also shows an interior outlet 204, which is similar or identical to outlet 114. Outlet 204 is mounted to interior side 112b of wall 112 and spaced apart from outlet 114 by some distance. FIG. 2 further shows a base plate 124a, similar or identical to base plate 124, which is positioned near exterior side 112a of wall 112, in close proximity to outlet 204. Accordingly, charging station 106 could be moved from base plate 124 to base plate 124a if desired, such as to relieve yard wear around plate 124. Components 116 and 118 could be relocated to the interior side 112b and the exterior side 112a of wall 112, respectively, adjacent to outlet 204. The outlet 204 could then be used to supply power for charging station 106, in the manner described above in connection with outlet 114.

Referring further to FIG. 2, there is shown a wall 206 adjacent to yard 202, wherein wall 206 comprises an exterior wall section of a garage or other building that is detached from the building of wall 112. Wall 206 has an exterior side 206a and an interior side 206b, and an electric outlet 208 is mounted to interior side 206b. FIG. 2 further shows a base plate 124b, similar or identical to base plate 124, positioned near exterior side 206a of wall 206, in close proximity to outlet 208. Components 116 and 118 could be relocated to the interior side 206b and the exterior side 206a of wall 206, respectively, adjacent to outlet 208.

FIG. 2 further shows a base plate 124c, which is similar or identical to base plate 124, placed in yard 202 at a location that is not close to any electrical service outlets. If charging station 106 is moved to base plate 124c, the alternate power source of charging station 106 would be used to supply power for charging robot 102. In other illustrative embodiments, one or more of the base plates 124, 124a, 124b, and 124c could simultaneously be attached to instances of charging station 106. In such an embodiment, the service robot 102 could, for example without limitation, move to the closest charging station when recharging was needed. Similarly, in a worksite with multiple service robots 102, more than one robot could be simultaneously charging.

Figure 3:
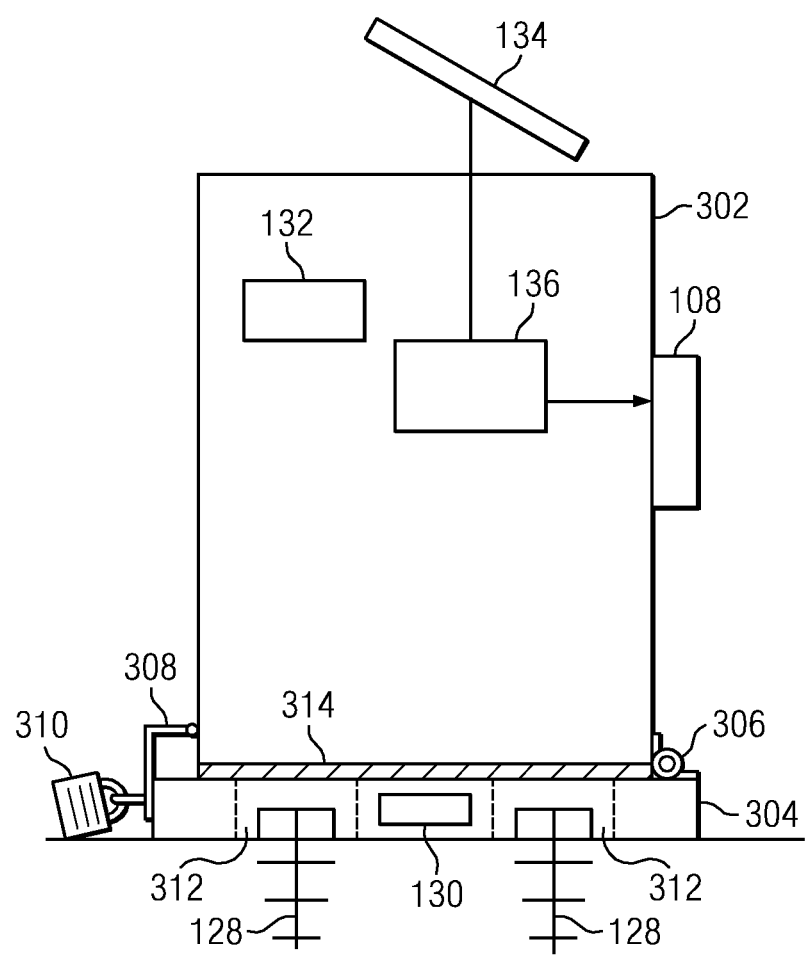
FIG. 3 is a schematic diagram showing a further embodiment of the invention.

Referring to FIG. 3, there is shown an embodiment of the invention that includes a charging station 302 and a base plate 304. Charging station 302 is similar to charging station 106 in that it includes a wireless power transmitter 108, which may be connected to a wireless power receiver 118 as described above, in order to supply power to a wireless power receiver 110 of robot 102. Charging station 302 may also be provided with a battery 136, a solar cell 134 and an alarm 132, as likewise described above.

Base plate 304 is similar to base plate 124 in that anchors 128 are used therewith, and a tampering sensor 130 may be placed in the base plate 304. However, station 302 and plate 304 are permanently and securely joined together, such as by means of a hinge 306. Hinge 306 is positioned between plate 304 and the lower right corner of station 302, as viewed in FIG. 3. FIG. 3 also shows a locking mechanism, such as a hasp 308 and padlock 310 or the like, for releasably locking the lower left corner of station 302, as viewed in FIG. 3, to base plate 304.

Referring further to FIG. 3, there are shown wells or spaces 312, which are each formed in plate 304 from the top thereof. Each well 312 is usefully of circular cross section, and is sized to accommodate one of the anchors 128, there being one well for each anchor. When the locking mechanism is released, station 302 may be pivoted about hinge 306, in a clockwise direction as viewed in FIG. 3. This will provide a user with access to each of the wells 312. The user would thus be able to screw an anchor in each well into the ground at a selected location, and into engagement with a lower element of the base plate. The plate 304 would thereby be firmly connected to the ground at the selected location.

When the anchors are in place, the station 302 would be pivoted back to rest on plate 304. The locking mechanism would then be engaged, such as by locking padlock 310, so that station 302 would be retained in its rest position upon base plate 304. FIG. 3 shows station 302 provided with a floor 314, which comprises a solid planar member that has no openings or apertures. The floor 314 is sized to overlay each of the wells 312, when station 302 is in its rest position on plate 304, to prevent access to anchors 128.

It is thus seen that a configuration comprising station 302 and base plate 304 can readily be moved from one location to another. At the same time, the configuration provides significant security measures to prevent unauthorized removal.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. An electrical power transfer station, comprising:
a power receiver wirelessly connectable to a power grid for receiving power;
a structure having a housing, connectable to a base plate, having a power transmitter, wirelessly connectable to a device containing a battery, for transmitting the received power to the device for charging the battery;
the base plate having a fixing means to a stationary support, wherein the base plate is placed at a specified ground location wherein the ground is the stationary support, and the fixing means are removable anchor means provided to selectively retain the base plate at the ground location; and
locking means to secure the fixing means to be tamper resistant, wherein:
the base plate is provided with a detector that is operable to detect efforts to remove the anchor means from the ground location.

2. The power transfer station of claim 1, wherein:
the base plate is further provided with an alarm that is responsive to operation of the detector.

3. A method for setting up an electrical power transfer station, comprising the steps of:
wirelessly connecting a power receiver to a power grid for receiving power;
connecting a structure to a base plate, the structure having a housing and a power transmitter, wirelessly connectable to a device containing a battery, for transmitting the received power to the device for charging the battery;
furnishing fixing means to the base plate, for fixing the base plate to a stationary support, wherein the base plate is placed at a specified ground location wherein the ground is the stationary support, and the fixing means are removable anchor means provided to selectively retain the base plate at the ground location; and
using locking means to secure the fixing means to be tamper resistant, wherein:
the base plate is provided with a detector that is operable to detect efforts to remove the anchor means from the ground location.

4. The method of claim 3, wherein:
the base plate is further provided with an alarm that is responsive to operation of the detector.

* * * * *